Figure 1:
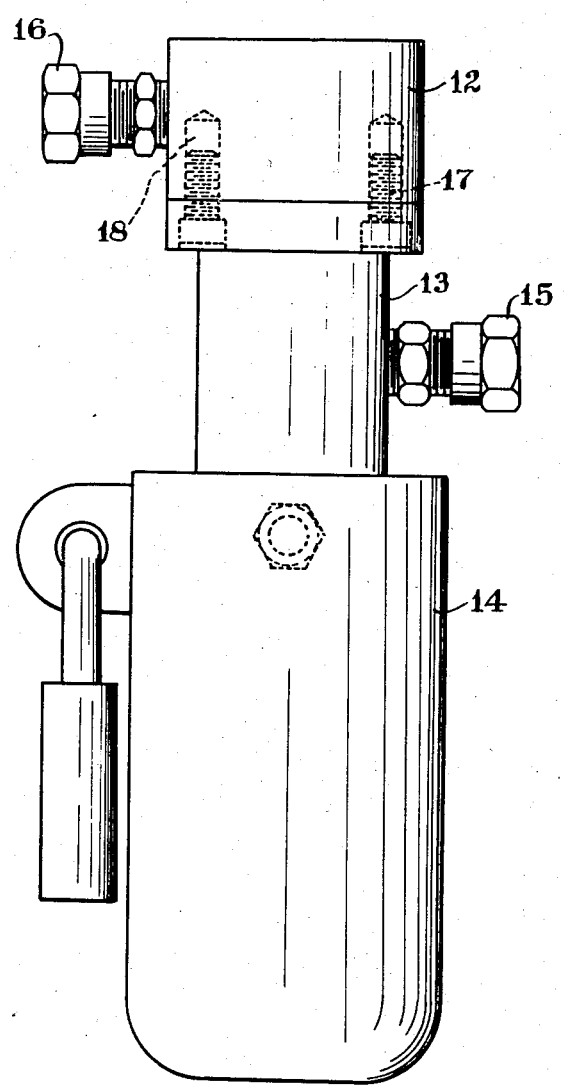

Aug. 21, 1951     T. E. RAYMOND     2,564,815
RELIEF VALVE

Filed Aug. 3, 1946     2 Sheets-Sheet 1

INVENTOR.
THOMAS E. RAYMOND
BY
ATTORNEY

Aug. 21, 1951

T. E. RAYMOND 2,564,815

RELIEF VALVE

Filed Aug. 3, 1946

2 Sheets-Sheet 2

INVENTOR.
THOMAS E. RAYMOND
BY
ATTORNEY

Patented Aug. 21, 1951

2,564,815

UNITED STATES PATENT OFFICE 2,564,815

RELIEF VALVE

Thomas E. Raymond, Zanesville, Ohio, assignor to Simplex Engineering Company, Zanesville, Ohio, a corporation of Ohio Application August 3, 1946, Serial No. 688,363

9 Claims. (Cl. 137—53)

The invention described in this application relates to valves. It is illustrated by a pressure relief valve of special design constructed according to my invention.

In pressure relief valves of ordinary construction there is a tendency to chatter. Such relief valves are ordinarily intended to operate either depending upon the pressure developed on one side of the valve or depending upon the differentials in pressures on opposite sides of the valve. As the absolute pressure or differential in pressures approaches the point at which the valve is intended to open and relieve the pressures, the valve tends to move rapidly from and to its seat, moving from its seat to relieve the pressure and moving back again almost immediately to the seat as soon as the pressure is slightly relieved. This tendency not only is annoying because of the noise developed but it also is wearing upon the valves, causing the valves to wear and deteriorate rapidly.

Pressure relief valves are intended to maintain a constant pressure in a chamber or passageway connected to one side of the valve or to maintain a substantially constant differential of pressures on opposite sides of the valve. Usually they operate upon the principle that as the differential in pressures develops on opposite sides of the valve, the differential in pressures acts upon the valve or a member connected thereto move the valve from its seat acting against a spring or other resilient member in so doing.

One of the objects of my invention is the provision of a new and improved pressure control valve.

A further object of my invention is the provision of a valve of this type which is less subject to chatter and chattering disturbances than other valves of this type.

A further object of the invention is the provision in a valve of the character described of a separate valve follower provided with means which forces the valve follower resiliently towards one side of the casing.

A feature of my invention is the provision of a spring which surrounds the valve follower and of a screw which bears on the spring.

Further objects and features of the invention will be apparent from the subjoined specification and claims when considered in connection with the accompanying drawings illustrating an embodiment of my invention.

Figure 2:
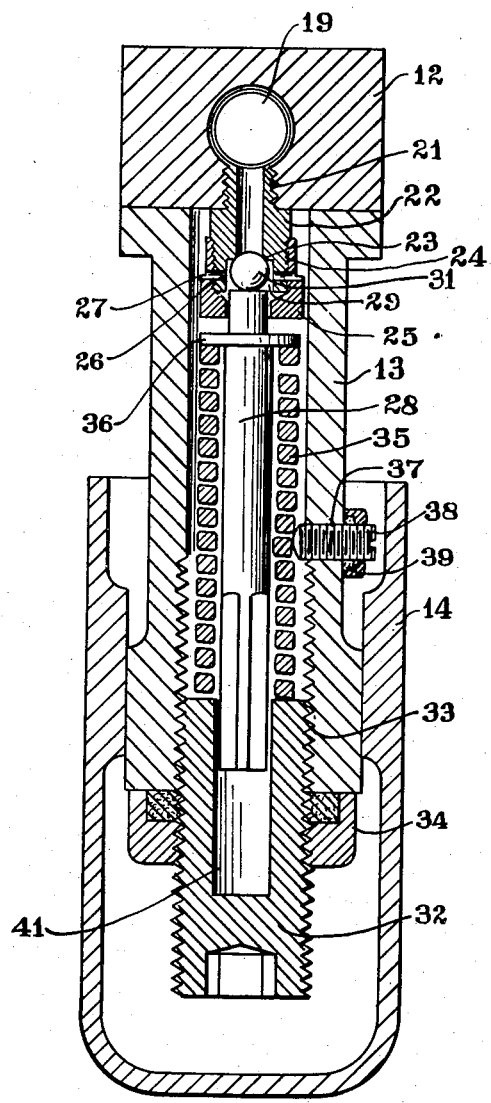

In the drawings:

Fig. 1 is a view in side elevation of a valve constructed in accordance with my invention; and Fig. 2 is a view in vertical section of the valve shown in Fig. 1.

Referring in detail to the drawings, it may be seen that I have shown in Fig. 1 a valve including an upper block 12, an intermediate casing 13 and a lower casing 14. Threaded into the intermediate casing 13 is a steel fitting 15 which serves as desired either as a connection to one side of the valve or as an outlet for surplus fluid to be released when the valve is used as a relief valve. The valve is also provided with a fitting 16 operatively connected to the opposite side of the valve and connected when the valve is used as a relief valve to the system in which the pressure is being controlled.

Referring still to Fig. 1, it may be seen that the upper casing 12 is secured to the intermediate casing 13 by screws such as the screws 17 and 18. Referring now to Fig. 2, it may be seen that the block 12 is provided with a transverse bore 19 which is intersected by a threaded vertical bore 21. Secured in the threaded vertical bore 21 is a plug 22 formed with threads which secure the plug within the bore 21. The plug 22 is formed with a valve seat 23 and has additional external threads 24 on which there is secured a valve cage 25. The plug 22 and the cage 25 are each provided with a plurality of vent openings such as 26 and 27, the openings in the plug being aligned with those in the cage. The lower portion of the cage 25 is provided with an opening through which the upper end of a valve stem 28 extends. Within the recess 29 formed in the plug 22 and within the cage 25 there is positioned a ball valve 31 which is adapted to contact the seat 23 and at times form a seal therewith. However, at other times the pressure of fluid in the bore 19 acting upon the ball valve 24 pushes it away from its seat and allows fluid to escape from the bore 19 into the recess 29 and thence through the aligned passages 26 and 27 into the interior of the intermediate casing 13 and thence out, if desired, through the fitting 15.

I provide means to urge the ball valve 31 resiliently to its seat. In the lower end of the intermediate casing 13 there is inserted a threaded plug or hollow adjusting screw 32 which cooperates with internal threads formed in the intermediate casing 13. On the threads of the plug 32 there is also screwed a nut 34 which serves both as a packing gland and also as a lock nut. Within the casing 13, surrounding the valve stem 28, and resting upon the inner end of the plug 32 is spring 35. The spring 35 bears at its upper end on a shoulder 36 formed integrally with the valve stem 28. The upper end of the valve stem 28 bears on the ball valve 31 and thus the spring acting through the shoulder 36 and the stem 28 acts on the ball valve 31 to urge it toward its seat against the pressure of the liquid in the bore 19. However, if the pressure of the liquid in the bore 19 exceeds a predetermined amount, it acts upon the ball 31 and through the ball upon the valve stem 28 and the spring 35 to compress the spring so that the ball 31 may move from its seat and liquid may pass out of the bore 19 into the interior of the intermediate casing 13 thus relieving the pressure in the bore 19 and the associated system. It may be here noted that the cover 14 is provided for the purpose of housing and protecting the lower end of the casing 13, the plug 32 and the packing gland 34 as well as a further device which I am now about to describe.

I provide means for urging the spring 35 and through the spring 35 the stem 28 toward one side of the casing. In so doing, the upper end of the stem 28 is urged toward one side of the cage 25 and bears upon that side of the cage so as to create a friction and retard movement of the valve 31 away from the seat 23 or after it is so moved, retard movement toward the seat 23. This arrangement provides means for preventing chattering of the valve. Extending through the casing 13 is a threaded screw 38 which serves as a dampener and which bears at its inner end on the spring 35, is held in place by internal threads formed in the tapped bore 37 and is provided with a combined lock nut and packing gland 39 which is also threaded onto the screw threads of the screw 38. The screw 38 cannot be adjusted unless the cover 14 is first removed. As the dampener screw 38 is screwed into the bore 37, it contacts the spring 35 and thus exerts a lateral force upon the valve rod 28 moving the upper end of the valve rod 28 toward one side of the valve cage 25 until the upper end of the stem contacts the valve cage as shown.

In the operation of this device, as a pressure relief valve, the bore 19 is connected through the fitting 16 with the body of fluid in which it is desired to maintain a substantially constant pressure. So long as the pressure does not exceed that for which the valve is set, the ball 31 remains on its seat. However, when the pressure does exceed such predetermined value, that pressure acts upon the face of the ball check 31 and through the ball check acts upon the stem 28. The stem 28 through the shoulder 36 compresses the spring 35 allowing the ball check 31 to move and thus allowing fluid to escape into the interior of the intermediate casing 13 and out through the fitting 15.

Should chattering develop, the hood 14 is removed, the lock nut 39 is loosened and the screw 38 is threaded further into the casing 13. Thus the spring 35 is pressed against the valve stem 28 and moves the upper end of the valve stem into contact with the cage 25 and the lower end of the valve stem into contact with the side of the plug 32. This creates a slight friction between the stem 28 and the cage 25 and between the stem and the plug 32. This friction prevents excessive movement of the valve stem and prevents chattering. It also allows a slight variation in the pressures developed in the bore 19. That is to say, a slightly higher pressure may be developed before the ball leaves its seat and a slightly lower pressure may be reached before the ball returns to its seat but this variation in pressures is so small as not to be detrimental to the action of the valve.

In the operation of the valve as a valve for maintaining a differential in pressures between two systems the bore 19 is connected through the fitting 16 to one system while the interior of the casing 13 as connected through the fitting 15 with another system. In such case the force acting to move the ball valve 31 from its seat is the pressure in the bore 19 acting on the exposed face of the ball valve. The force acting to return the ball to its seat is the force of the spring 35 and in addition the force of the fluid in the system connected to the interior of the casing 13 acting on an equivalent area at the bottom of the ball valve.

It may be noted that fluid in the interior of the casing 13 has free access to the recess 41 formed in the lower portion of the hollow adjusting screw 32 and that the upper end of the valve stem 28 has a comparatively close fit in the lower opening in the cage 25. Thus liquid in the interior of the casing 13 is allowed to enter into the recess 41 and act on the lower end of the stem 28. Liquid flowing from the bore 19 past the ball valve 31 is diverted by shape of the ball and thus mostly passes out through the openings 26 and 27. The small size of the opening through which the upper end of the valve stem 28 extends and the close clearance between the upper end of the valve stem and the opening in the bottom of the cage prevents any substantial amount of liquid from passing through that opening and contacting the upper side of the shoulder 36 with force sufficient to cause a surge action and excessive movement of the valve stem.

It is to be understood that the above described embodiment of my invention is for the purpose of illustration only and various changes may be made therein without departing from the spirit and scope of my invention.

I claim:

1. A fluid pressure responsive valve comprising a valve seat, a valve adapted to contact said seat, a valve stem arranged to contact said valve, a coil spring for resiliently urging said valve stem toward said valve, and fixed means engaging one side only of the coil spring intermediate the ends thereof for constantly urging the spring toward one side relative to the longitudinal axis of said valve stem.

2. A pressure responsive valve comprising a valve seat, a valve closing element comprising a ball arranged to contact said seat, a valve stem arranged to contact said ball, means for resiliently urging said valve stem toward said ball, a lateral surface with which said valve stem is adapted to contact, and adjustable means urging said resilient means and stem toward said lateral surface to create a friction to prevent chattering.

3. A fluid pressure responsive valve comprising a valve seat, a valve element urged toward said seat, a coil spring for urging said valve element toward said seat, and fixed means constantly bearing on one side only of said coil spring and laterally displacing said spring.

4. A pressure responsive valve comprising a valve seat, an element resiliently urged toward said seat, a cage surrounding said element, a valve stem contacting said element, a spring acting on said valve stem, and adjustable means acting on one side of said spring and urging the valve stem through the spring laterally toward one side of said cage to provide a longitudinally retarding movement of said element relative to said seat.

5. A pressure responsive valve comprising a valve seat, an element resiliently urged toward said seat, a cage surrounding said element, a valve stem contacting said element, a spring acting on said valve stem, and means comprising an adjustable screw acting on said spring and urging the valve stem through the spring toward one side of said cage to create friction to prevent chatter.

6. A pressure responsive valve comprising an upper block, having a fluid passage therein, a plug threaded into said block and forming a valve seat, a cage threaded onto said plug, a ball valve in said said cage and adapted to contact said valve seat, an intermediate casing secured to said upper block, a valve stem within said intermediate casing passing upward through an opening in said cage and adapted to contact said ball valve, a spring within said intermediate casing surrounding said valve stem and urging said valve stem into contact with said ball valve and thus urging said ball valve into contact with said seat, and adjustable plug closing the lower end of said intermediate casing, an adjustable screw threaded through said intermediate casing and bearing upon said spring and through the agency of said spring urging said stem into contact with said cage and with said plug and constituting means for preventing chattering.

7. A pressure responsive valve comprising an upper block, having a fluid passage therein, a plug threaded into said block and forming a valve seat, a cage formed with lateral openings and with a vertical opening threaded onto said plug, a ball valve in said cage and adapted to contact said valve seat, an intermediate casing secured to said upper block, a valve stem within said intermediate casing passing upward through said vertical opening in said cage and adapted to contact said ball valve, a spring within said intermediate casing surrounding said valve stem and urging said valve stem into contact with said ball valve and thus urging said ball valve into contact with said seat, an adjustable plug closing the lower end of said intermediate casing, an adjustable screw threaded through said intermediate casing and bearing upon said spring and through the agency of said spring urging said stem into contact with said cage and with said plug and constituting means for preventing chattering, fluid escaping from the cage into the interior of said intermediate casing through the lateral openings of the cage.

8. A pressure responsive valve comprising a valve seat, a valve closing element comprising a ball arranged to contact said seat, a cage for said ball formed with a vertical opening, a valve stem arranged to contact said ball passing upward through and having a relatively close fit in said vertical opening, a spring for resiliently urging said valve stem toward said ball, a lateral surface with which one end of said valve stem is adapted to contact, and a screw bearing against said spring to urge said stem resiliently toward said lateral surface to create a friction to prevent chattering.

9. A pressure responsive valve comprising an upper block, having a fluid passage therein, a plug threaded into said block and forming a valve seat, a cage formed with lateral openings and with a vertical opening threaded onto said plug, a ball valve in said cage and adapted to contact said valve seat, an intermediate casing secured to said upper block, a valve stem within said intermediate casing passing upward through said vertical opening in said cage and having a relatively tight fit in said vertical opening in order to prevent a surge of fluid through said vertical opening around said stem and adapted to contact said ball valve, a spring within said intermediate casing surrounding said valve stem and urging said valve stem into contact with said ball valve and thus urging said ball valve into contact with said seat, an adjustable plug closing the lower end of said intermediate casing, an adjustable screw threaded through said intermediate casing and bearing upon said spring and through the agency of said spring urging said stem into contact with said cage and with said plug and constituting means for preventing chattering, said fluid escaping from the cage into the interior of said intermediate casing through the lateral openings of the cage.

THOMAS E. RAYMOND.

REFERENCES CITED

The following references are of record in the file of this patent:

UNITED STATES PATENTS

| Number | Name | Date |
| --- | --- | --- |
| 1,746,220 | Manning | Feb. 4, 1930 |
| 1,773,268 | Jenkins | Aug. 19, 1930 |
| 1,773,726 | Deming | Aug. 26, 1930 |
| 1,877,938 | Moore | Sept. 20, 1932 |
| 1,896,706 | Grimes | Feb. 7, 1933 |
| 2,314,553 | Palm | Mar. 23, 1943 |
| 2,410,165 | Johnson | Oct. 29, 1946 |
| 2,452,956 | Robins | Nov. 2, 1948 |